Jan. 29, 1946.　　R. R. GUNDERSON　　2,393,679
HOSE COUPLING
Filed Sept. 28, 1944　　2 Sheets-Sheet 1
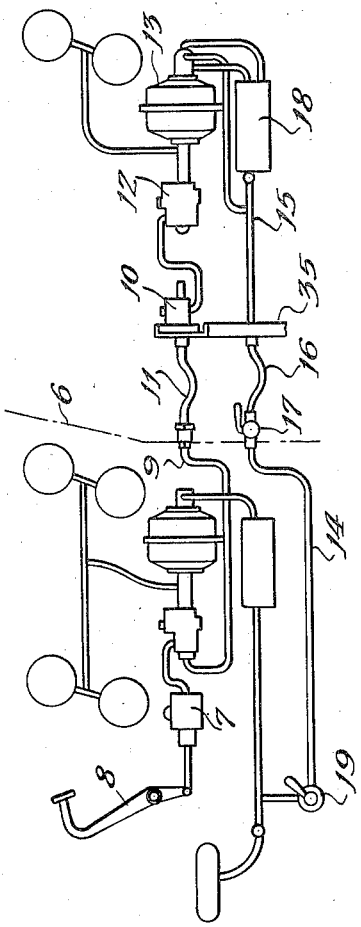
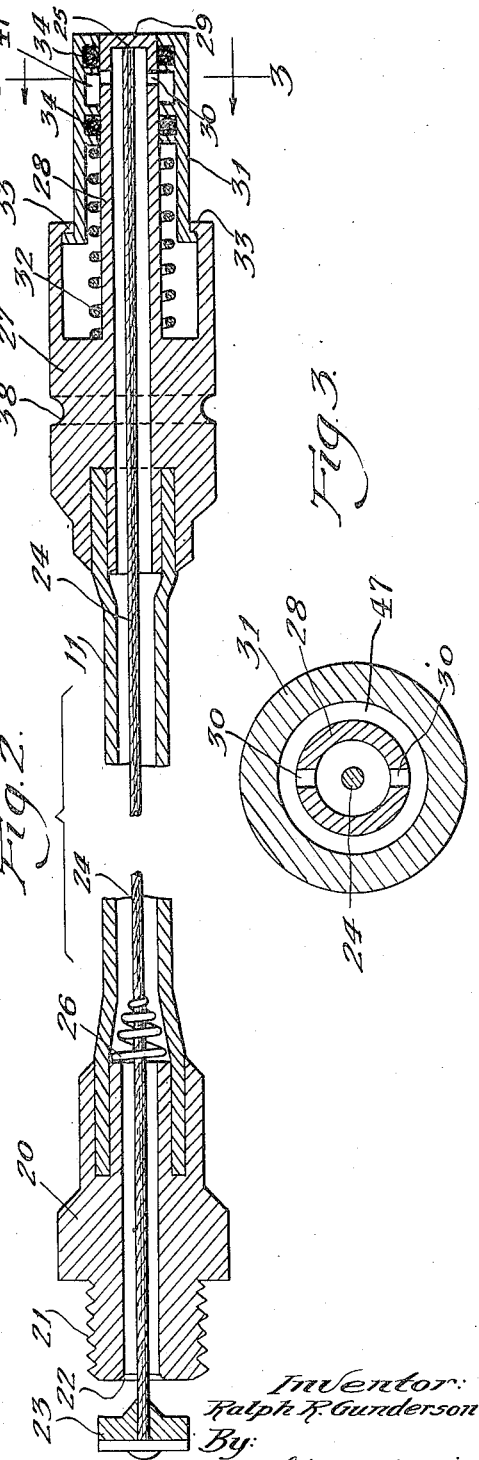
Inventor:
Ralph R. Gunderson
By Chutton, Wiles, Schroder & Merriam
Attorneys Inventor:
Ralph R. Gunderson
By
Chritton, Wiles, Schroeder & Merriam
Attorneys Patented Jan. 29, 1946

2,393,679

UNITED STATES PATENT OFFICE 2,393,679

HOSE COUPLING

Ralph R. Gunderson, Chicago, Ill.

Application September 28, 1944, Serial No. 556,138

7 Claims. (Cl. 284—18)

This invention relates to coupler joints for hoses, and more particularly to coupler joints which may be opened and closed without loss of liquid.

The primary object of the invention is to provide an improved coupling wherein the pressure of liquid or gas in the hose does not exert a pressure which tends to open the coupling.

Another object of the invention is to provide an improved coupler wherein the ports in the plug member and in the socket member are closed automatically when the plug is pulled out of the socket. The coupler is particularly adapted for connecting the brake systems of a tractor truck to a trailer, and as the brake fluid is automatically trapped in each part when the coupling is opened, no additional brake fluid is required in the tractor on disconnection at the coupler.

A further object of the invention is to provide a safety valve for the end of the hose, which will be closed automatically in the event that the hose is broken, or the couplers on the hose are accidentally pulled apart.

A further object of the invention is to provide an improved socket member, which will automatically bleed out any air that might be entrapped in the coupling while a connection is being made.

Another object of the invention is to provide an improved socket member for a coupler, which will automatically connect the main conduit to a reservoir, when the plug member is disconnected.

Figure 4:
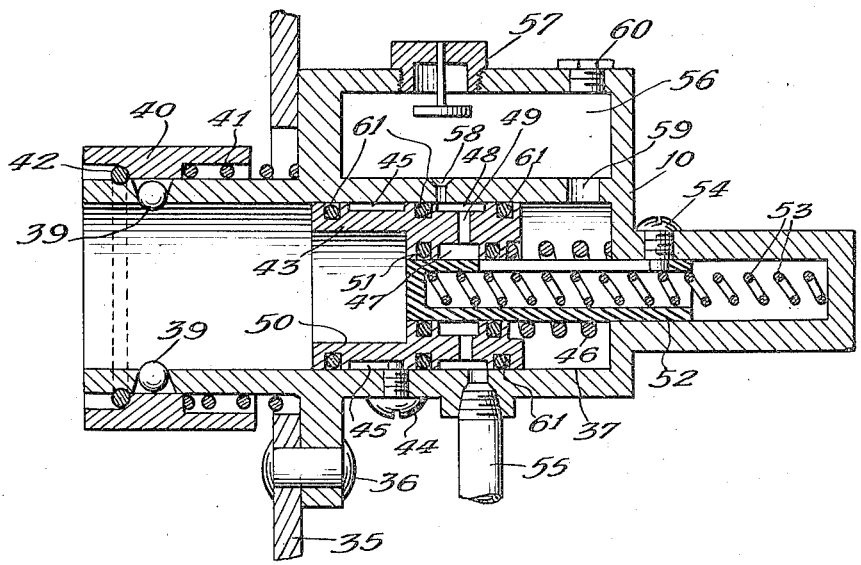

The invention is illustrated in a preferred embodiment in the accompanying drawings in which:

Figure 1 is a diagrammatic view of a brake system of a tractor and trailer, utilizing the improved hose coupling; Fig. 2, a broken longitudinal sectional view of a hose equipped at each end with a coupling hose; Fig. 3, a sectional view of the plug member taken as indicated at line 3—3 of Fig. 2; Fig. 4, a vertical sectional view of the socket member in closed position; and Fig. 5, a vertical sectional view of the socket member with the plug member inserted and fluid communication established.

As the present invention is particularly adapted to connect the brake system of trucks and trailers, the diagram of such a system is shown in Fig. 1. A section line 6 separates the tractor side at the left from the trailer side at the right. A master cylinder 7, actuated by a brake pedal 8, is adapted to force brake fluid through a conduit 9 to the rear of the tractor. The trailer side has a socket connection 10, where connection may be established with the conduit 9, by means of the coupling hose 11. It will be understood that the brake fluid actuates the master cylinder 12, which may be equipped with a suction booster 13. A suction line 14 from the manifold of the tractor engine may be connected to the suction line 15 in the trailer, by means of a suction hose coupling 16, provided with a hand-operated cock 17. A storage tank 18 and booster 13 are connected to the suction line 15 in such a way that if the hose 16 breaks or becomes disconnected, the brakes on the trailer will be set automatically in a known manner. As the present invention is concerned primarily with the hose 11, its terminal members and the socket member 10, the remainder of the system will not be described in detail.

As shown in Figure 2, the hose 11 is provided on its tractor end with a metal connector member 20, which makes a threaded connection 21 with the conduit 9. The connector member 20 affords a seat 22 for a valve member 23, mounted on the end of a stiff wire 24, which extends through the hose and connector members and abuts against the inside of the plug member, as shown at 25. A spring 26 is secured to the wire 24, and abuts against the connector member 20, so as to urge the valve member 23 to a closed position. This closing action is opposed by compression on the wire by the plug member.

It will be understood, that if the hose 11 should be broken, or its connector members pulled apart by accidental uncoupling of the trailer, the valve member 23 will close and the brake system of the tractor will not be rendered ineffective through loss of brake fluid. In case of accidental uncoupling, the suction hose 16 would probably be broken at the same time, and this would set the brakes of the trailer automatically. The brakes of the trailer can also be set by the hand valve 19 in the truck.

Figure 5:
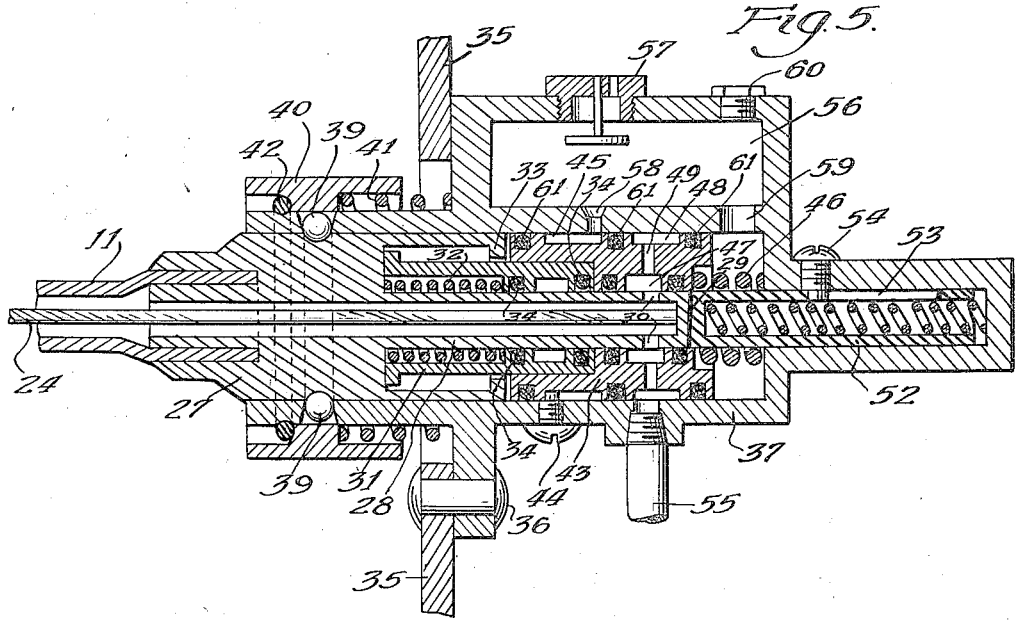

As shown in Figs. 2, 3 and 5, the hose 11 is provided at its rear end with a plug member 27, having a rearwardly extending hollow shank 28, which is closed at its rear end by a wall 29. The member 28 is provided with laterally extending ports 30, which provide the only communication with the inside of the hose 11. A sleeve member 31 is slidably mounted on the shank 28, and is urged to its rearmost position, as illustrated at Fig. 2, by the compression spring 32. An outwardly extending flange on the front end of the member 31 abuts against an inwardly extending flange 33 on the member 27, and limits the rearward travel of the sleeve. Suitable packing rings 34 are provided, so that when the sleeve 31 is in the position shown in Fig. 2, the ports 30 are sealed.

As best shown in Figs. 4 and 5, the socket portion 10 of the coupling is secured to the frame 35 of the trailer by suitable rivets 36. This unit has a cylinder 37, which is of sufficient diameter to receive the plug member 27. The plug member may be provided with an annular groove 38, to be engaged by balls 39 locked in the position illustrated in Fig. 5, by a locking ring 40 urged forwardly by a compression spring 41 against a clamping ring 42.

A socket member 43 is slidably mounted in the cylinder 37, and its travel is limited by a stud screw 44 extending into a groove 45 provided in the periphery of the socket member. The socket member is urged to the position shown in Fig. 4, by a compression spring 46. The member is provided with an inner annular groove 47, and an outer annular groove 48, which are connected by laterally extending ports 49.

The socket member has a bore 50, of sufficient diameter to receive the sleeve member 31, and has a counter-bore 51, to make a snug telescoping connection with the shank 28.

When the plug is disengaged, as indicated at Fig. 4, the bore 51 in the socket member is closed by a plunger member 52, which is urged forwardly by a compression spring 53 and has its travel limited by a stud screw 54. The cylinder 37 has a laterally extending port connected to the conduit 55, which leads to the master cylinder 12 of the trailer. On the top side of the cylinder 37 is a brake fluid reservoir 56, provided with a conventional filler cap 57. A port 58 in the bottom of the reservoir communicates with the conduit 55, when the socket member is disengaged from the plug, as indicated in Fig. 4. This enables any air in the conduit 55 to escape into the reservoir, and keeps the conduit filled with brake fluid. Another port 59 in the cylinder 37 communicates with the reservoir and the cylinder back of the socket member 43. This port prevents any pressure or suction from building up in the cylinder back of the socket member, which might retard its travel. A plug 60 merely closes an opening in the top of the reservoir, which is needed to drill the port 59. Suitable packing rings 61 are provided, as indicated, to prevent leaking between the sliding parts, which must be kept fluid tight.

When it is desired to make a coupling between the hose 11 and the conduit 55, the locking ring 40 is pressed rearwardly, and the plug member is inserted and locked into the position shown in Fig. 5. In this operation, the end 29 of the plug member will press the plunger 52 rearwardly, and establish communication between the ports 30 and the groove 47 of the socket member, so that communication will be established to the conduit 55. At the same time, the end of the sleeve 31 will abut against the shoulder in the counter-bore 50, and will be pressed forwardly. At the same time, the socket member 43 will be pressed rearwardly, so as to close the port 58 to the reservoir 56. Communication is thus established without releasing entrapped fluid in either part of the coupler.

It will be noted that in the coupled position shown in Fig. 5, liquid pressure between the plug and socket member is in a lateral direction, and exerts no longitudinal force to open the connection. The only forces tending to open the connection are those exerted by the light compression springs 32, 46 and 53, which are easily held by the spring locking device.

It will be understood that when the coupling is disconnected, the end of the plug member 27 will be enclosed by a suitable cap or hood (not shown), which may latch into the groove 38 and protect the end of the connector from injury and dirt. This member may be loosely attached by means of a chain. In like manner, it is desirable to provide a plug to fit into the front end of the cylinder 37, and prevent dirt from getting into the coupler while it is disconnected.

The foregoing detailed description is given for clearness of understanding only, and no unnecessary limitations should be understood therefrom, for some modifications will be obvious to those skilled in the art.

I claim:

1. A coupling joint for a hose comprising: a plug member having a closed outer end and a laterally extending port, a sleeve member slidably mounted on said plug and adapted to open and close said port, a spring urging said sleeve member to closed position; and a socket member having an opening to receive said plug member and having a lateral port which communicates with the port in the plug and is sealed off from communication with the outer end of the plug when said plug is in operating position in said socket.

2. A coupling joint as specified in claim 1, in which a plunger is slidably mounted for movement into the socket member to open and close the lateral socket port, and a spring urging said plunger to closed position.

3. A coupling joint as specified in claim 1, in which the socket member is slidably mounted in a cylinder having a front laterally extending port communicating with a reservoir and a rear port communicating with a conduit, said socket member being movable to positions where the socket port will communicate with the front or rear cylinder ports, and a spring urging said socket member to a position where said socket port will communicate with said front cylinder port.

4. A coupling joint for a hose comprising: a plug member having a closed outer end and a laterally extending port; and a socket member having a cylindrical opening to receive said plug and provided with an annular port to communicate with said port in the plug when the plug is inserted, a plunger slidably mounted for movement in the cylindrical opening in the socket member serving normally to close the annular port but open it after said plug has been inserted, and a spring urging said plunger to closed position.

5. A coupling joint as specified in claim 4, in which the socket member is slidably mounted in a cylinder having a front laterally extending port connected to a reservoir and a rear laterally extending port connected to a conduit, a spring urging said socket member to a position where its port communicates with said reservoir, and said socket member being movable with the plug member to a position where the port in the plug member will communicate with said conduit.

6. In a hose provided with a connector member, a valve seat for the hose in said connector member, a stiff wire in said hose provided at one end with a valve member adapted to fit into said seat and close the valve, a spring on said wire urging the valve member to closed position, and abutment means at the other end of the hose adapted to engage the opposite end of the wire and normally hold said valve open.

7. Apparatus as specified in claim 6, in which the abutment means comprises a coupler secured to the hose, said coupler having a closed end to engage the end of the wire, and a lateral port communicating with the inside of said hose.

RALPH R. GUNDERSON.